United States Patent [19]

Hahn et al.

[11] Patent Number: 4,975,592
[45] Date of Patent: Dec. 4, 1990

[54] CURRENT SUPPLY ARRANGEMENT HAVING A STAND-BY MODE FEATURING LOW POWER CONSUMPTION

[75] Inventors: Friedrich Hahn, Wilhelmshaven; Friedrich Kording, Hamburg, both of Fed. Rep. of Germany

[73] Assignee: U.S. Philips Corporation, New York, N.Y.

[21] Appl. No.: 321,606

[22] Filed: Mar. 10, 1989

[30] Foreign Application Priority Data

Mar. 17, 1988 [DE] Fed. Rep. of Germany ....... 3808863

[51] Int. Cl.$^5$ ............................................. H04N 3/18
[52] U.S. Cl. ......................................... 307/38; 307/75; 363/21; 358/190
[58] Field of Search ............................... 307/34–41, 307/112–117, 141.8, 278, 279; 250/213 R, 213 A, 214 SW, 200, 201; 363/15–28, 49; 315/380, 411; 358/188, 190, 194.1; 455/343, 352; 323/282–290

[56] References Cited

U.S. PATENT DOCUMENTS

4,651,214 3/1987 Rodriguez-Cavazos ........... 358/190

Primary Examiner—A. D. Pellinen
Assistant Examiner—David Osborn
Attorney, Agent, or Firm—Edward W. Goodman

[57] ABSTRACT

A current supply arrangement, for supplying at least one load with electric energy from a source, includes a switching stage for optionally switching-on the load according to a switching signal applied thereto and a control circuit which, in its switched-off state, cuts the supply of energy to the switching stage and, to the load and in its switched-on state, controls the energy supply to at least the switching stage. Current supply arrangements of such a type are used more specifically in television sets having remote control for "normal operation" and a "stand-by mode". So as to obtain for this arrangement the advantages of the "stand-by mode" and, on the other hand, to reduce the electrical power consumed and also the number of modules loaded by heating or voltage charges, the switching signal is also applied to the control circuit for switching between the switched-off and the switched-on states.

7 Claims, 3 Drawing Sheets

CURRENT SUPPLY ARRANGEMENT HAVING A STAND-BY MODE FEATURING LOW POWER CONSUMPTION

BACKGROUND OF THE INVENTION

1. Field of the Invention

The invention relates to a current supply arrangement for supplying at least one load with electric energy from a source. The current supply arrangement includes a switching stage for optionally switching-on the load in accordance with a switching signal applied thereto and a control circuit which in its switched-off state cuts the supply of energy to the switching stage and to the load, and in its switched-on state controls the energy supply to at least the switching stage, the control circuit also receiving the switching signal for switching between the on and off states. The control circuit includes a start circuit by which the energy required for changing from the switched-off state to the switched-on state can be applied from the source to the control circuit, and which is made operative for the supply of energy to the control circuit by the switching signal. The current supply arrangement also includes a switching signal transmission device for transmitting the switching signal to the switching stage and the control circuit, the switching signal transmission device being supplied with the electrical energy required for its operation from the start circuit.

2. Description of Related Art

The VALVO data book "Integrierte Analogschaltungen für Fernseh- and Videogeräte" 1987, pages 285 to 294, describes a control circuit for a current supply arrangement in the form of a switched-mode power supply in color television sets, which is designed as a monolithically integrated circuit. In this control circuit, a what is commonly denoted a "stand-by mode" is provided, in which the control circuit drives a power supply switching transistor through which a current is periodically passed from a line voltage rectifier through a primary winding of a line transformer and consequently a supply voltage is generated on the secondary side of the line transformer, with which a microprocessor is supplied, which controls the function of the television set, more specifically the adjustment of the programs to be received and the adjustments for volume, brightness, etc. In what is commonly referred to as the "normal operation", also all the further circuit portions of the color television set are supplied with energy from the line transformer. They can be connected to the power supply by the microprocessor.

In the "stand-by mode" the picture display and sound reproduction of the television set are indeed switched-off by the microprocessor, but it remains itself in operation, to provide that it can switch on the television set again. This operating mode is used in television sets with remote control and in the "stand-by mode" also the remote control receiver in the television set is supplied with current, to enable it to switch the set on again at any moment via the remote control. Consequently, in the "stand-by-mode" the switched-mode power supply with the control circuit, the microprocessor and the remote control receiver remain continuously in operation and therefore require an electric power which is so high as not to be disregarded. In addition to current consumption costs, the set is heated unnecessarily and circuit sections not required are loaded by electric voltage, which means that there is a risk of damage to the set and also of electrical accidents to the operator.

German Patent DE No. 34 12 341 discloses a television set which is supplied from the 220 V main supply and includes an evaluation circuit 5 which switches the television set on, and a switched-mode power supply 12 having a "Stand-by I state", a "Stand-by II state" and a normal state. In this set a remote control signal amplifier applies pulses to the switched-mode power supply for adjusting it to the "Stand-by II state", and transfers the pulses to the evaluation circuit. The energy for the short switch-on interval of the set is supplied by an electrolytic capacitor of a power supply 4. The remote control signal amplifier is supplied with energy by the power supply 4.

SUMMARY OF THE INVENTION

The invention has for its object to improve a current supply arrangement of the type defined in the opening paragraph in such a manner that for loads supplied thereby, the advantages of a "stand-by mode" are retained and also the electric power consumed in this operating mode and also the number of components loaded by heating or voltage is reduced. It must thereby be possible to utilize components, more specifically integrated circuits, already present in the simplest possible way.

According to the invention, this object is achieved for a power supply of the type defined in the opening paragraph characterized in that the current supply arrangement is structured as a switched mode power supply having a switching element controlled by the control circuit and an inductive element charged with electric energy by the switching element, from which, in the switched-on state of the control circuit, the energy is derived for this control circuit and also for the switching signal transmission device, the switching stage and the load, the energy for the control circuit and the switching signal transmission device being taken from an energy storage device which is supplied from both the start circuit and the inductive element.

In the arrangement described in the Valvo data book, the switching signal is only evaluated in the switching stage, so that this stage, in any operating mode in which such an evaluation might be possible, must be supplied with electric energy. As this energy is produced by the current supply arrangement controlled by the control circuit, this supply arrangement must consequently also remain in operation. In the arrangement according to the invention, the control circuit is also switched-off or optionally switched-on by the switching signal, the current supply arrangement then consequently only applies electric energy to the switching stage when the stage, according to the switching signal, is to perform a switching function or when the current supply arrangement supplies at least one of the connected loads with electric energy. Outside of these periods, the control circuit and the switching stage are not operative. This results in a saving in electric energy and also heating and stray voltages are avoided. The control circuit can therefore be adjusted to its switched-off state without any negative effect on the response of the switching stage to the switching signal.

In a current supply arrangement including a start circuit which can supply from the source the control circuit with the energy required for the transition from the switched-off to the switched-on state, the start circuit is made operative by the switching signal for the supply of energy to the control circuit. The start circuit, which hereinafter is assumed to be part of the control circuit, is preferably made operative when the control circuit itself is fed with energy taken from the source by the current supply arrangement, as then as yet no energy supplied by the current supply arrangement itself is available for the change to the switched-on state.

The switching signal transmisson device for transmitting the switching signal to the switching stage and the control circuit, is supplied with the electric energy required for its operation from the start circuit. Consequently, the start circuit continuously applies energy to the switching signal-transmission device, while the circuit portions which apart from the start circuit are themselves comprised in the control circuit are supplied with energy only according to the switching signal. The energy consumption of the current supply arrangement and the loads together is then reduced to the extremely low current consumption of the switching signal transmission device, when all the loads are inoperative. Nevertheless, the loads can be made operative again at any moment by the switching signal. Particularly suitable as a switching signal transmission device is a remote control receiver via which the loads can be centrally controlled.

The current supply arrangement according to the invention has the structure of a switched-mode power supply including a switching element controlled by the control circuit and an inductive element charged with electric energy thereby, from which in the switched-on state of the control circuit the energy is derived for the control circuit and also for the switching signal-transmission device, the switching stage and the load(s), the energy for the control circuit and for the switching signal transmission device being obtained from an energy storage device, which is supplied from both the start circuit and the inductive element. The inductive element is preferably designed as a transformer for d.c. isolation between the source and the loads, for example for line voltage isolation. Preferably, the energy storage device includes a capacitor, but it may alternatively include an inductance and be designed such that the energy contained therein for the change-over of the control circuit to the switched-on state is sufficient. In the arrangement according to the invention, the start circuit, which is always present, can be driven in a simple manner by the switching signal, in addition thereto the internal functions of the control circuit are not changed by the invention with respect to the prior art. The invention can therefore be advantageously put into effect in already existing current supply arrangements, without the need for any essential changes. More specifically, pre-fabricated circuit modules, such as monolythically integrated circuits are suitable for use with the invention without any changes.

Preferably, the energy storage device is switched to the active by the switching signal for the control circuit, when the control circuit is to be adjusted to the switched-on state, in contrast to which the switching signal transmission device is continuously in an operative connection with the energy storage device. In the switched-on state of the control circuit, the energy for the switching signal transmission device can then also be applied via the inductive element. It is indeed true that the energy storage device could be fully isolated from the control circuit after the change to the switched-on state, when energy is supplied via the inductive element, but a continuous connection between the energy storage device and the control circuit in the switched-on mode can however be provided in a more simple manner, in addition the energy storage device can be utilized as a smoothing device for the voltage, with which the energy is supplied from the inductive element.

In addition, it is advantageous in a current supply arrangement in which the control circuit assumes the switched-off state when the voltage applied to it via a supply voltage terminal fall falls at least once short of a first threshold value and does not exceed a second, higher threshold value, and assumes the switched-on state when the voltage at the supply voltage terminal exceeds the second threshold value at least once and does not fall short of the first threshold value, and in which the energy storage device is a capacitive storage device and is connected to the supply voltage terminal, that the energy storage device is shunted by a voltage limiter circuit which can be made operative by a switching signal and limits the voltage at the energy storage device for the switched-off state of the control circuit to a value near the second threshold value, and lower than this value.

For the case in which the voltage limiter circuit is out of function, the start circuit applies energy from the source to the capacitive energy storage device, which results in an increase in the voltage at the energy store and consequently at the supply voltage terminal, until the second threshold value is exceeded, and thereby the control circuit is adjusted to the switched-on state. The current supply arrangement is made operative along these lines when the voltage limiter circuit is switched to the inoperative state by the switching signal. The first and the second threshold values then constitute a switching hysteresis, with the object of preventing disturbances by voltage fluctuations at the energy storage device.

Basically, the first threshold voltage can at least be substantially equal to the second threshold value and consequently the switching hysteresis can be cancelled to a very great extent or fully, so that the voltage at the energy storage device is always limited by the voltage limiter circuit to such a degree that the control voltage passes to the switched-off state. The switching signal or the switching signal transmission device must then be of such a structure that a distinction can be made between the two possible states of the control circuit. The embodiment of the invention mentioned in the foregoing is in contrast thereto also suitable for already existing arrangements, in which such an additional information in the switching signal is not contained. These arrangements and consequently the format of the switching signal can then remain unchanged for implementing the invention and the switching signal transmission device can be of a simple and consequently energy-saving structure.

When, in an elaboration of the current supply arrangement according to the invention, an acknowledge signal is supplied by at least one of the connected loads, by which the voltage limiter circuit is adjusted to the inoperative state, an error-free functioning of the control circuit after the transition to the switched-on mode is then also ensured when a switching signal is no longer present. This is more specifically the case when the switching signal is transmitted via a remote control, so as to save energy in the remote control transmitter. The switching signal is there only transmitted for a change in the operating state of the overall arrangement.

Advantageously, the switching signal transmission device includes, in addition to a receiving stage for receiving the switching signal over a transmission path and for conveying it to the switching stage, also a signal shaping stage, through which the switching signal is applied to the voltage limiter circuit. The signal shaping stage shapes, from the switching signal format adapted to the switching stage a format which is adapted for controlling the start circuit. Particularly for the purpose of line voltage isolation, the receiver stage is advantageously connected to the switching stage via a coupling stage for d.c. isolating the signal path of the switching signal. Preferably, opto-couplers are used as the coupling stages, but alternatively high-frequency transmitters or capacitive coupling elements can be used.

The acknowledge signal can additionally be evaluated in a supervising stage which, when the acknowledge signal does not come, produces an interrupt signal to adjust the control circuit to the switched-off state, independently of the voltage at its supply voltage input. Consequently, the supervising stage then renders it possible to adjust the control circuit to the switched-off state, which is only initiated by the switched-off of the load supplying the acknowledge signal, independently of any further operating conditions.

BRIEF DESCRIPTION OF THE DRAWINGS

The invention and how it can be put into effect will now be described in greater detail by way of example with reference to embodiments shown in the accompanying Figures, in which.

DESCRIPTION OF THE PREFERRED EMBODIMENTS

Figure 1:
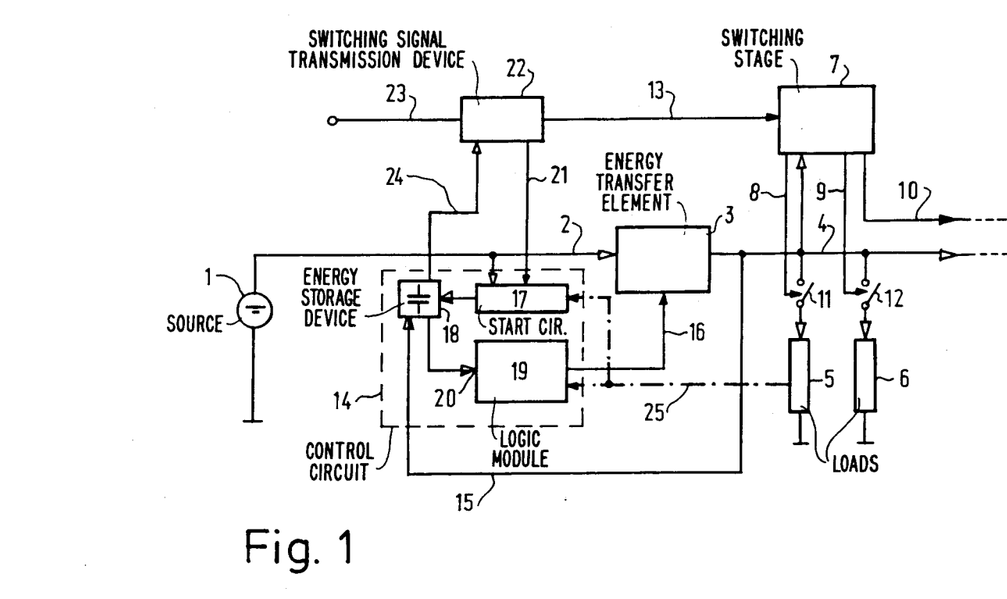
FIG. 1 shows a block circuit diagram of a first embodiment of a current supply arrangement of the invention.

In the block circuit diagram of FIG. 1, a source 1 supplies via a line 2, an energy transfer element 3 and a distributor 4 for a plurality of loads, of which only two are shown for the sake of simplicity, denoted by the reference numerals 5 and 6. The light arrow heads designate the energy flow. A switching stage 7 is supplied with electric energy via the distributor 4, the switching stage 7, by means of switches 11, 12 which are operated via switching lines 8, 9 and 10, respectively, optionally connect the loads 5, 6 or also further loads to the distributor 4 and consequently to the energy supply from the source 1. This connection is effected according to a switching signal applied to the switching stage 7 over a switching signal line 13. The dark arrow heads designate a controlling connection for operation.

The supply of energy to the loads 5, 6 and to the switching stage 7 is controlled by a control circuit 14 with the aid of the energy transfer element 3, such that in a switched-off state of the control circuit 14, the energy supply is interrupted and in a switched-on state, the control circuit 14 is controlled via the energy transfer element 3. To that end, the voltage from the distributor 4 is applied to the control circuit 14 via a supply voltage terminal 15 for the supply of energy and simultaneously for the transmission of the actual value of the voltage, which is indicated by a half light/half dark arrow. The energy transfer element 3 is controlled by the control circuit 14 via a setting output 16 for adjusting a constant voltage on the distributor 4.

The energy transfer element 3 can be structured as a switched-mode power supply comprising an inductive element and a switching element actuated via the setting output 16, which periodically connects the inductive element to the source 1. Instead thereof any other arrangement suitable for setting an energy flow can alternatively be used, for example a regulation transistor or a corresponding other element.

Since the control circuit 14 is only supplied with energy via the supply voltage terminal 15 when it is already in the switched-on state, and a change to this state is not possible without the supply of energy, the control circuit 14 includes a start circuit 17, which supplies energy directly from the source 1 and from which the voltage is conveyed to an energy storage device 18 and stored there. The energy thus fed into the energy store storage device 18 is consequently available to the control circuit 14, irrespective of its operating state, for the change from the switched-off mode to the switched-on mode. The energy store 18 preferably comprises as the storage element a capacitor which additionally serves as a smoothing element for the energy supply and through which from there also the energy supply from the distributor 4 to the supply voltage terminal 15 is conveyed. All the further portions of the control circuit 14, which are combined in one module, denoted as the logic module 19, are supplied from the energy store 18. The voltage at the input 20 of the logic module 19 supplies thereto the electric energy required for its operation and also the actual value of the voltage on the distributor 4.

The switching signal received through a transmission path 23 and also applied to the switching stage 7 over the switching signal line 13 is applied to the starter circuit 17 incorporated in the control circuit 14 via an additional switching signal line 21 from a switching signal-transmission device 22. The control circuit 14 can be adjusted to the switched-off state when all the loads 5, 6 are disconnected from the switching stage 7 and consequently the energy supply via the distributor 4 to the switching stage 7 and to the control circuit 14 can be interrupted, the control possibility by means of the switching signal nevertheless being maintained. If in the switched-off state of the control circuit 14 a switching signal arrives, the start circuit 17 is activated thereby for the supply of energy to the control circuit 14 and, more specifically, to the logic module 19. The energy stored in the energy store 18 via the start circuit 17 is applied—triggered by the switching signal—to the logic module 19 and the logic module is made operative thus. As a result thereof, the control circuit 14 becomes operative, the energy transfer element 3 being controlled via the setting output 16 such that it supplies energy to the distributor 4. In the manner described, the switching stage 7 and the control circuit 14 are supplied with energy from the distributor 4, and this renders the switching stage 7 operative for a further evaluation of the switching signal on the switching signal line 13.

The switching signal transmission device 22 receives the energy necessary for its operation also from the energy storage device 18 through a line 24 and consequently via the start circuit 17 directly from the source 1, independently of the operating state of the control circuit 14.

In a variation of the functional modes described, the energy store storage device 18 may alternatively be totally or partly without energy at the moment the switching signal arrives for the first time during the switched-off state of the control circuit 14. As a result thereof, the procedure from the moment the switching signal arrives up to the moment the load to be switched-on becomes operative is extended by the period of time used to supply the required energy to the energy storage device 18. In addition, the switching signal transmission device 22 can in certain circumstances not be supplied directly from the energy storage device 18, but only directly from the start circuit 17.

The change of the control circuit 14 to its switched-off state can be effected, on the one hand, with the aid of the switching signal via the additional switching signal line 21 and the start circuit 17, in that the start circuit interrupts the supply of energy from the energy storage device 18 to the logic module 19 via the input 20. Another possibility is, that that one of the loads 5, 6 which is switched-off last from the switching stage, applies an acknowledge signal via an acknowledge signal line 25 to the control circuit 14, as long as it is supplied with electric energy. In the present example, this is the load 5. The acknowledge signal is applied to the start circuit 17 or to the logic module 19. When this signal does not come forward, the logic module 19 is put out of operation via the starter circuit 17 directly or by rendering the energy storage device 18 inactive put.

In a modification of the arrangement described, the acknowledge signal may alternatively contain an information about the actual value of the voltage at the distributor 4, so that it can be readjusted by the logic module 19 via a control loop which is closed via the acknowledge signal line 25.

Figure 2:
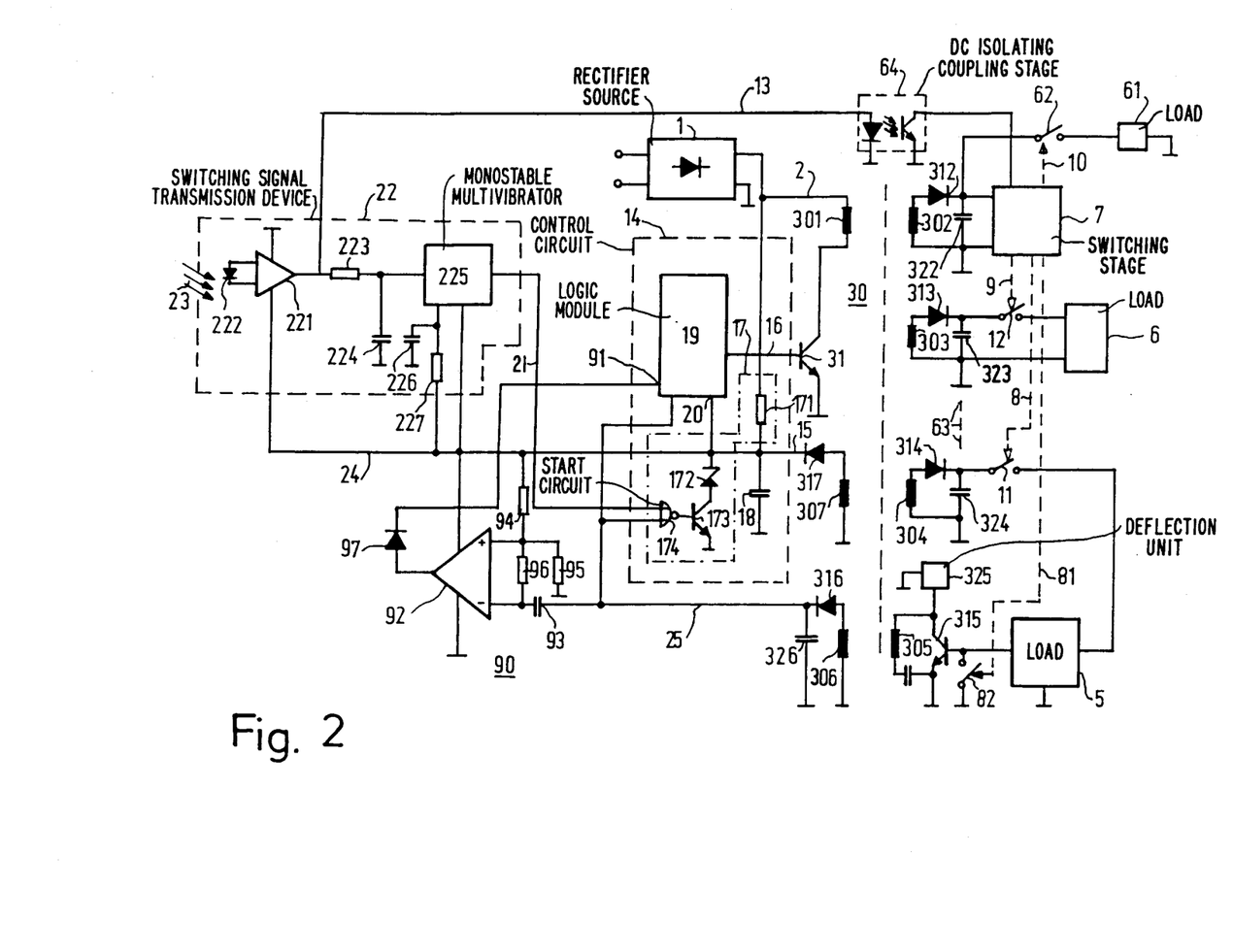
FIG. 2 shows a block circuit diagram of a second embodiment of the current supply arrangement.

FIG. 2 shows, as a second embodiment in a somewhat more detailed manner of representation, a current supply arrangement for a television set, in which components corresponding to those in FIG. 1 are again given the same reference numerals. The source 1 is constituted by a line voltage rectifier which supplies the line 2 with a smoothed d.c. voltage of, for example, 300 Volts. This voltage is applied to the primary winding 301 of an inductive element 30, which, for the purpose of line voltage isolation, is designed as a transformer having secondary windings 302 to 307 which are d.c. isolated from the primary winding 301. The primary winding 301 is arranged in series with the main current path of a switching element 31 and connected between the line 2 and ground. The inductive element 30 and the switching element 31 perform the function of the energy transfer element 3 and the distributor 4 as a switched-mode power supply. To that end, the switching element 31 is periodically adjusted by the control circuit 14 to the conductive and the non-conductive state via the setting output 16.

The secondary windings 302, 303, 304 are connected to the loads 5, 6 and the switching stage 7, respectively, via rectifiers 312, 313 and 314, and filter capacitors 322, 323, 324, respectively, the loads 5, 6 being connectable to the filter capacitors 323, 324 via connecting lines 8, 9 and switches 11, 12 by the switching stage 7. A further load 61 is connected in parallel with the switching stage 7 to the filter capacitor 322 and is connected via a further switch 62, which is controlled by the connecting line 10. Moreover, additional loads, which are not shown but only indicated by three lines 63, are connectable to the inductive element 30, more specifically either to the existing filter capacitors—as the load 61—or to additional secondary windings.

The start circuit 17 includes a high-ohmic resistor 171 which is arranged in series between the line 2 and ground together with the energy storage device 18 constituted by a capacitor. The energy storage device 18 is charged from the source 1 via the resistor 171 and the resistor 171 is therefor dimensioned such that the current applied across it is just sufficient for supplying the modules of the arrangement which, in the switched-off state of the control circuit 14, still consume current. In addition, the energy storage device 18 is shunted by a voltage limiter circuit constituted by a zener diode 172 which is switchable to the operative or the non-operative state by a transistor 173 arranged in series therewith. This is effected either by the switching signal applied through the additional switching signal line 21 or by the acknowledge signal on the acknowledge signal line 25 which are combined into a control voltage for the base terminal of the transistor 173 via a NOR gate 174 (which is supplied with energy from the line 24). In the switched-off state of the control circuit 14, the transistor 173 is conductive and the zener diode 172 limits the voltage at the energy storage device 18 to a predetermined value.

The switching signal transmission device 22 includes a receiving stage having a signal amplifier 221 which amplifies the signal supplied by a photo diode 222 and is supplied with energy from the start circuit 17 via the line 24. A modulated infra-red light signal 23 is applied as a switching signal to the photo diode 222 through the free space (or other light conducting media), which forms the transmission path through which light passes, and the signal amplifier 221 applies a corresponding electric signal to the switching signal line 13. From there the switching signal is applied via a d.c. isolating coupling stage 64—in this case an opto-coupler—to the switching stage 7 for the purpose of evaluation.

In addition, the switching signal transmission device 22 includes an evaluation circuit whose basic object is to suppress interference in the switching signal, to suppress the influence thereof on the control circuit 14 through the additional switching signal line 21. In the present example, this evaluation circuit is constituted by an integrator having a series resistor 223 and a shunt capacitor 224 and also a subsequent signal or pulse shaping stage comprising a monostable multivibrator 225 with elements 226 (capacitor) and 227 (resistor) determining the duration of the pulses supplied to the additional switching signal line 21. The evaluation circuit can alternatively be provided with a counter or a logic combining circuit. This is also supplied with, energy from the line 24. In a particularly energy-saving construction, the evaluation circuit may be omitted, but then a slightly increased susceptability of the arrangement to interferences of the additional switching signal line must be tolerated.

Instead of the transmission of the switching signal with the aid of infrared light, other transmission media can of course alternatively be used, for example ultrasonic or also a wired transmission, which however, is preferably d.c. isolated from the switching signal transmission device 22.

A known, monolithically integrated circuit is preferably used as the logic module 19 in the control circuit 14 of the present example, whose operating behavior can advantageously be utilized for the current supply arrangement. More specifically, this circuit has, as regards the voltage applied to it to the input 20 via the supply voltage terminal 15 and consequently from the energy storage device 18, a hysteresis such that the logic module 19, and consequently the control circuit 14, assumes the switched-off state when the voltage at the input 20 falls short at least once from a first threshold value and does not exceed a second, higher threshold value, and that it assumes the switched-on state when the voltage at the input 20 exceeds the second threshold value at least once and does not fall short of the first threshold value. In this situation, the value to which the voltage limiter circuit 172, 173 limits the voltage at the energy storage device 18 is located in the voltage range between the two threshold values and in this range more particularly just below the second threshold value.

When the source 1 is made operative, the control circuit 14 is in the switched-off state, the switching element 31 is non-conducting and the energy storage device 18 is gradually charged from the energyless state, until the voltage limiter circuit 172, 173 which becomes simultaneously operative, terminates the charging procedure. Only the switching signal transmission device 22 is then still supplied via the resistor 171 and is ready to receive a switching signal, while the logic module 19 continues to be in the switched-off state, in which only a very small current flows through it. The total energy requirement of the arrangement is extremely low in this state.

When a signal 23 arrives via the transmission path 23, which is recognized by the integrator 223, 224 as a switching signal, the pulse-shaping stage 225 produces a positive pulse on the additional switching signal line 21 by which the transistor 173 is cut-off via the NOR-gate 174. This renders the voltage limiter circuit 172, 173 inoperative and the energy storage device 18 is further charged via the resistor 171 until the voltage at the input 20 exceeds the second threshold value. This sets the logic module 19 to the switched-on state, causing first its current consumption at the input 20 to be significantly increased. This current is supplied by the energy storage device 18. The logic module 19 supplies a control signal, with which the switching element 31 is periodically rendered conductive and non-conductive via the setting output 16. A voltage is induced at the secondary winding 307 of the inductive element 30 and is rectified by a rectifier 317 for supplying electric energy to the energy storage device 18. Consequently, the energy storage device 18 additionally serves as a filter capacitor for the energy supply via the secondary winding 307 and is dimensioned such, that the energy stored therein is sufficient to maintain the switched-on state until the build-up of the voltage across the secondary winding 307, i.e. up to this instant, the voltage at the input 20 shall not decrease to below the first threshold value. Should this be the case, the logic module 19 and consequently the control circuit 14 would return to the switched-off state, the energy storage device 18 would be charged again by the resistor 171, till a further change-over of the logic module 19 occurs at the moment the second threshold value is exceeded.

Simultaneously with the voltage at the secondary winding 307 voltages also occur at all the other secondary windings 302 to 306. More specifically, the switching stage 7 is supplied with electric energy via the secondary winding 302, so that the switching signal applied via the switching signal line 13 and the opto-coupler 64 is evaluated and thereafter the relevant loads can be switched-on.

The logic module 19 is of such a structure that the control signal at the setting output 16 tracks the voltage fluctuations at the input 20, so that a constant voltage is produced at the energy storage device 18.

For the current supply arrangement of a television set, the deflection circuit is more specifically of importance, which in FIG. 2 is shown as the load 5. It controls a deflection transistor 315 and via this transistor a deflection unit 325, whose operating principle is known and consequently need not be described in greater detail. Using a switch 82 controlled via a switching line 81, the deflection transistor 315 and consequently the deflection unit 325 can be switched off.

When the deflection unit 325 is in the switched-on state, line retrace pulses are induced across it by the secondary winding 305 in the secondary winding 306 and from these pulses a voltage is generated on the acknowledge signal line 25 via a rectifier 316 and a filter capacitor 326, which voltage depends on the amplitude of the line retrace pulses and is applied as an acknowledge signal to the control circuit 14. Consequently, the acknowledge signal maintains the transistor 173 in the non-conductive state via the NOR-gate 174, and the voltage limiter circuit consequently remains inoperative also after the pulse on the additional switching signal line 21 has decayed. Moreover, the acknowledge signal arrives directly at the logic module 19 and serves there for tracking the control signal at the setting output 16, so that the current supply arrangement is controlled by the deflection unit.

Loads can optionally be connected to or disconnected via the switching stage 7 up to the deflection circuit (load 5) or tuning and setting procedures can be effected in the television set by means of further switching signals. This does not have any influence on the operation of the current supply arrangement.

If, however, a switching signal is applied with which the switching stage switches the deflection circuit off, no pulses are induced anymore in the secondary winding 306, as a result whereof the voltage on the acknowledge signal line 25 breaks down. On the one hand, this renders the voltage limiter circuit 172, 173 operative, on the other hand, the voltage breakdown, which occurs as a negative voltage edge on the acknowledge signal line 25, is shaped into a pulse in a supervising stage 90 constituted by a differentiator and the pulse is applied as an interrupt signal to an interrupt signal input 91 of the logic module 19. This pulse adjusts the logic module 19 and consequently the control circuit 14 to the switched-off state independently of the voltage at the input 20, the switching element 31 is cut-off and no power is supplied anymore to the loads. As a result of the current consumption by the logic module 19 and the switching signal-transmission device 22 (and also the supervising stage 90), also the voltage at the energy storage device 18 breaks down since no sufficient current can be replenished via the resistor 171. When the voltage falls short of the first threshold value, the logic module 19 changes to the switched-off state. Because of the resultant significantly reduced current consumption of the logic module 19, the voltage at the energy storage device 18 increases again until it is limited by the voltage limiter circuit 172, 173. Then the current supply arrangement is again ready to be switched-on by a further switching signal.

The supervising stage 90 is provided with a differential amplifier 92 which in the present case is supplied with energy from the energy storage device 18. The voltage on the acknowledge signal line 25 is applied to the inverting input of the differential amplifier via a capacitor 93, while the non-inverting input is connected via a voltage divider 94, 95 to a reference voltage, in this case to the energy storage device 18. A compensation resistor 96 interconnects the inputs of the differential amplifier; its output is connected to the interrupt signal input 91 via a diode 97.

The supervising stage 90 ensures a reliable transition to the switched-off state without the occurrence of intermediate control errors by the logic module 19. On breakdown of the voltage on the acknowledge signal line 25, the logic module 19 would first, in the absence of the pulse at the interrupt signal input 91, induce an upward control and consequently an increase in the energy transmission, before the voltage on the acknowledge signal line 25 is reduced to such a great extent because of the predominant effect of the retrace pulse not coming forward, that the logic module 19 finally as yet interrupts the control signal at the setting output 16.

If instead of a switching signal only an interference is transmitted over the additional switching signal line 21, a transition of the control circuit 14 from the switched-off to the switched-on state is indeed also effected. As however the switching stage 7 does not recognize a switching signal with which it would render the deflection circuit operation, no acknowledge signal is forwarded and after a decay of the interference, the voltage limiter circuit 172, 173 becomes active again. Because of the missing voltage on the acknowledge signal line 25, the logic module 19 passes to the switched-off state and remains there because of the voltage which is limited again in the meantime at the energy storage device 18.

Figure 3:
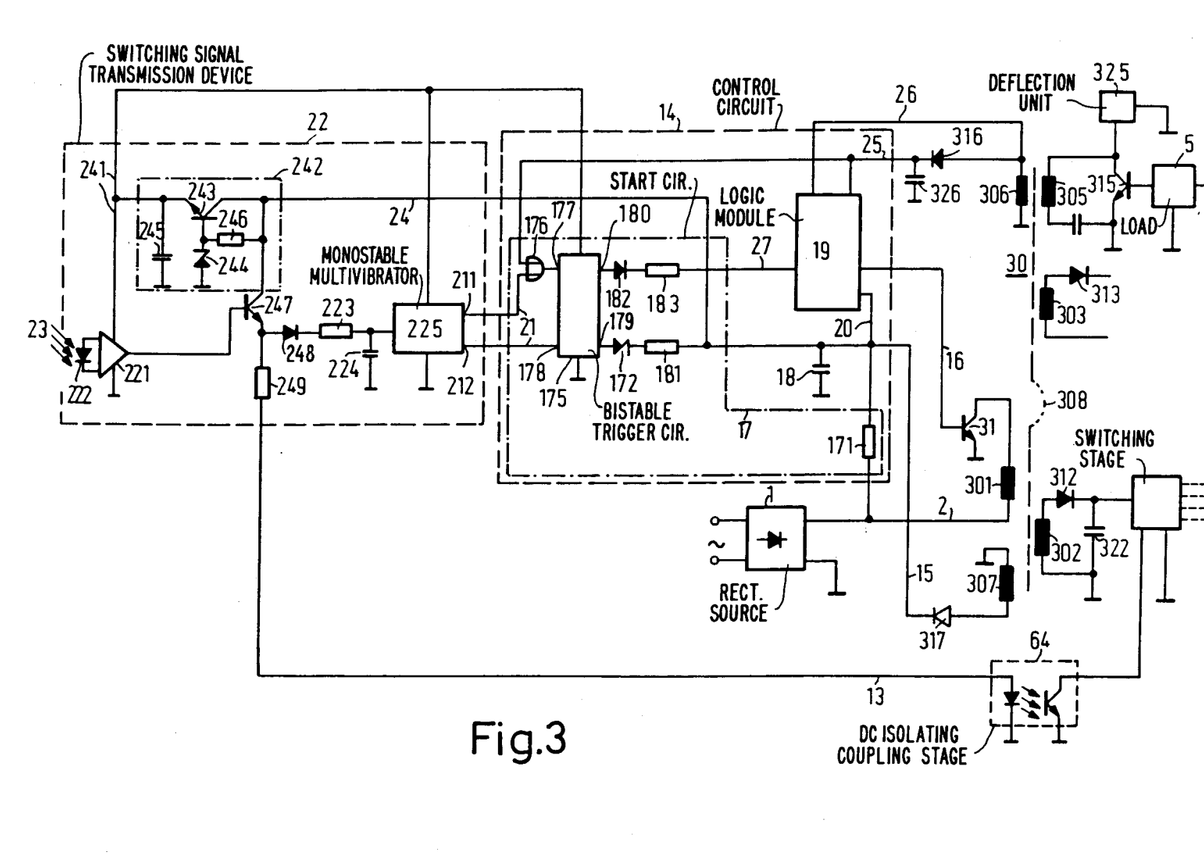
FIG. 3 shows a modification of the second embodiment of the current supply arrangement of FIG. 2.

FIG. 3 shows a modification of the circuit arrangement of FIG. 2, in which elements already described are again given the same reference numerals.

In the arrangement of FIG. 3, the inductive element 30 is again constituted by a transformer having windings 301 to 307 which are d.c. isolated from each other, the winding 304 not being shown for simplicity of the drawing. The primary winding 301 is magnetically tightly coupled to the secondary windings 302 and 307 but, via an air gap 308, there is only a weak coupling to the secondary windings 303, 305 and 306, which themselves are tightly coupled to each other.

A monolithically integrated circuit is preferably used as the logic module 19, for example of the type TDA 3640. Its function corresponds to a very great extent to the function described in FIG. 2. Additionally, the logic module 19 of FIG. 3 is provided with a second acknowledge signal line 26 for a second acknowledge signal from the secondary winding 306. While a time-averaged acknowledge signal is transmitted over the acknowledge signal line 25, the second acknowledge signal line 26 is pulse-shaped. It is preferably derived from the line retrace pulses of the television set from the secondary winding 305. As long as the second acknowledge signal is applied to the logic module 19 via the second acknowledge signal line 26, the module switches the switching element 31 in such a manner that the line retrace pulses are controlled on a constant amplitude.

FIG. 3 shows a further modification of the start circuit 17 with respect to the embodiment shown in FIG. 2. Now the monostable multivibrator 225 has two outputs, a non-inverting output 211 and an inverting output 212 which are connected to a bistable trigger circuit 175 via the additional switching signal line 21 which is now of a two-wire structure. The non-inverting output 211 is connected to a resetting input 177 via an OR-gate 176, the inverting output 212 is connected to a setting input 178 of the bistable trigger circuit 175. A non-inverting output 179 of the bistable trigger circuit 175 is connected to the energy storage device 18 via the zener diode 172 and an additionally inserted resistor 181, in contrast whereto an inverting output 180 of the bistable trigger circuit 175 is connected to an additional control input 27 of the logic module 19 via a diode 182 and a further resistor 183.

In the arrangement of FIG. 3 the voltage from the energy storage device 18 is further conveyed via the line 24 not directly, but via a voltage stabilizing circuit 242 for the supply of energy to the signal amplifier 221, the monostable multivibrator 225, the bistable trigger circuit 175 and also, not shown, the OR-gate 176. The stabilized supply voltage is conducted through a section of the line, denoted by 241. The voltage stabilizing circuit 242 includes a series transistor 243, through whose collector-emitter path, the current for the supply of energy flows from the line 24 to the section 241. The series transistor 243 has its base terminal connected to ground via a zener diode 244. The zener diode 244 determines the stabilized supply voltage, which voltage charges a smoothing capacitor 245 arranged between the emitter terminal of the series transistor 243 and ground. In addition, the collector and base connection of the series transistor 243 is shunted by a parallel resistor 246.

The signal amplifier 221 controls, in the present example, the integrator 223, 224 via an output transistor 247 which has its collector terminal connected to the non-stabilized supply voltage on the line 24 and whose emitter terminal is connected to the series resistor 223 via a diode 248. This arrangement achieves that the current consumed by the integrator 223, 224 does not influence the supply voltage on the section 241 and thus the functional mode of the modules supplied via this section 241. Moreover, the switching signal line 13 is supplied from the emitter terminal of the output transistor 247 via a further resistor 249.

When the source 1 is put into operation, the bistable trigger circuit 175 is in the switched-off state, the zener diode 172 is connected to ground via the non-inverting output 179 and consequently limits the charging procedure of the energy storage device 18, as has already been described in the foregoing with reference to FIG. 2. The bistable trigger circuit 175, the OR-gate 176, the signal amplifier 221 and the monostable multivibrator 225 are supplied with energy and kept in the operative state via the line 24 and its section 241. Without the presence of a signal on the transmission path 23, the monostable multivibrator 225 carries a high voltage at its non-inverting output 211 and at a low voltage its inverting output 212.

On arrival of a signal via the transmission path 23, the monostable multivibrator 225 produces a pulse on the additional switching signal line 21, more specifically a positive voltage pulse at its non-inverting output 211 and a negative voltage pulse at its inverting output 212. The negative voltage jump at the setting input 178 changes the bistable trigger circuit 175 over in such a manner that its non-inverting output 179 is isolated from ground and consequently the voltage limitation at the energy storage device 18 becomes inactive because of the zener diode 172. As a result thereof, the logic module 19 changes to the switched-on state, as has been described for the arrangement in accordance with FIG. 2. When in that situation a voltage is applied via the acknowledge signal line 25 to the OR-gate 176 by way of its second input, this prevents a resetting of the bistable trigger circuit 175, also when the pulse produced by the monostable multivibrator 225 at the non-inverting output 211 has ended.

The duration of the pulse supplied by the monostable multivibrator 225 has been chosen of such a high value that it bridges the time interval between two consecutive signals on the transmission path 23 which are recognized as switching signals. Thus, after the first signal the energy supply of the switching stage 7 is initiated, which is then still operative, when the second signal arrives and is applied to the switching stage 7 via the coupling stage 64. If in contrast thereto the signal from the transmission path 23 is not recognized as a command to switch-on the load, also the acknowledge signal on the acknowledge signal line 25 is not forthcoming, and at the end of the pulse on the additional switching signal line 21, the bistable trigger circuit 175 is reset. On the one hand, this causes the voltage limitation via the zener diode 172 to become active again, on the other hand, a positive voltage jump is conveyed from the inverting output 180 of the bistable trigger circuit 175 to the additional control input 27 of the logic module 19, through which the control of the switching element 31 via the setting input 16 is interrupted. This causes also the further energy supply to the logic module 19 via the supply voltage 115 to be interrupted, as has already been described with reference to FIG. 2.

We claim:

1. A current supply arrangement for supplying at least one load with electric energy from a source, said current supply arrangement comprising a switching stage for optionally switching-on said at least one load in accordance with a switching signal applied thereto, and a control circuit which, in a switched-off state, cuts off a supply of energy to the switching stage and to said at least one load, and in a switched-on state, controls the supply of energy to at least the switching stage, said control circuit receiving said switching signal for switching between the switched-off state and the switched-on state and comprising a start circuit by which energy required for changing the control circuit from the switched-off state to the switched-on state is supplied from the source to the control circuit, said start circuit being made operative for the supply of energy to the control circuit by the switching signal, said current supply arrangement further comprising a switching signal transmission device for transmitting the switching signal to the switching stage and to the control circuit, said switching signal transmission device being supplied with electrical energy required for its operation from the start circuit, characterized in that said current supply arrangement further comprises switched mode power supply means for receiving energy from said source and for supplying energy to said at least one load and said switching device, said switched mode power supply means having a switching element controlled by the control circuit and an inductive element charged with electric energy from said source by said switching element, said inductive element, in the switched-on state of said control circuit, supplying the energy for the switching stage, and said at least one load, to a supply voltage terminal of the control circuit and, in turn, to the switching signal transmission device, wherein said control circuit assumes the switched-off state when a voltage applied to said supply voltage terminal falls short at least once from a first threshold value and does not exceed a second, higher threshold value, and assumes the switched-on state when the voltage at the supply voltage terminal exceeds the second threshold value at least once and does not fall short of the first threshold value, said control circuit further comprising a capacitive energy storage device coupled to said supply voltage terminal for receiving the energy from said inductive element and coupled to said start circuit for receiving the energy for the switching signal transmission device from the start circuit, said capacitive energy storage device being switched to an active state by the switching signal for the control circuit, and a voltage limiter circuit shunting the capacitive energy storage device, said voltage limiter circuit being operated by the switching signal and limiting the voltage at the capacitive energy storage device for the switched-off state of the control circuit to a value near the second threshold value and lower than the second threshold value.

2. A current supply arrangement as claimed in claim 1, characterized in that at least one of said at least one load provides an acknowledge signal for said control circuit by which the voltage limiter circuit is switched to the inoperative state.

3. A current supply arrangement as claimed in claim 1 or 2, in which the switching signal transmission device includes a receiving stage for receiving the switching signal via a transmission path and for conveying the switching signal to the switching stage, characterized in that said control circuit further comprises a signal shaping stage, via which the switching signal is applied to the voltage limiter circuit.

4. A current supply arrangement as claimed in claim 3, characterized in that the receiver stage is connected to the switching stage via a coupling stage for d.c. isolating the signal path of the switching signal.

5. A current supply arrangement as claimed in claim 2, characterized in that said control circuit further comprising a supervising stage, which, when the acknowledge signal does not arrive, produces an interrupt signal for adjusting the control circuit to the switched-off state independently of the voltage at its supply voltage terminal.

6. A current supply arrangement as claimed in claim 2, in which the switching signal transmission device includes a receiving stage for receiving the switching signal via a transmission path and for conveying the switching signal to the switching stage characterized in that said control circuit further comprises a signal shaping stage, via which the switching signal is applied to the voltage limiter circuit, and a supervising stage, which, when the acknowledge signal does not arrive, produces an interrupt signal for adjusting the control circuit to the switched-off state independently of the voltage at its supply voltage terminal.

7. A current supply arrangement as claimed in claim 4, in which the switching signal transmission device includes a receiving stage for receiving the switching signal via a transmission path and for conveying the switching signal to the switching stage, characterized in that the receiver stage is connected to the switching stage via a coupling stage for d.c. isolating the signal path of the switching signal, and said control circuit further comprises a signal shaping stage, via which the switching signal is applied to the voltage limiter circuit, and a supervising stage, which, when the acknowledge signal does not arrive, produces an interrupt signal for adjusting the control circuit to the switched-off state independently of the voltage at its supply voltage terminal.

* * * * *